US005279386A

United States Patent [19]

Cearley

[11] Patent Number: 5,279,386

[45] Date of Patent: Jan. 18, 1994

[54] RESCUE HARNESS

[76] Inventor: Richard R. Cearley, 12201 Castlebay Pl., Northridge, Calif. 91326

[21] Appl. No.: 23,564

[22] Filed: Feb. 25, 1993

[51] Int. Cl.[5] ............ A01K 29/00

[52] U.S. Cl. ............ 182/3; 182/6; 119/907

[58] Field of Search ............ 182/3-7; 119/96

[56] References Cited

U.S. PATENT DOCUMENTS 3,804,698 4/1974 Kinloch ............ 182/3 X 5,010,850 4/1991 Sailer ............ 182/3 X

FOREIGN PATENT DOCUMENTS 643655 8/1962 Italy ............ 182/3

*Primary Examiner*—Alvin C. Chin-Shue

*Attorney, Agent, or Firm*—J. E. Brunton

[57] ABSTRACT

A rescue harness for interconnecting the upper body portions of a person with a safety line. The harness includes an upper body portion encircling loop which is uniquely designed to remain open to receive the person's head and arms after which it automatically cinches down about the person's back or chest in a manner to positively secure the person within the harness loop.

12 Claims, 4 Drawing Sheets

RESCUE HARNESS

BACKGROUND OF THE INVENTION

1. Field of the Invention

The present invention relates generally to rescue harnesses. More particularly, the invention concerns a normally open harness which automatically cinches down about the victim's chest and back upon a lifting force being exerted on the harness.

2. Discussion of the Invention

Various types of rescue harnesses and slings have been suggested in the past. Typically these devices comprise an elongated strap portion which is formed into a loop that is adapted to pass around the wearer's back or chest and under both arm pits. The loop is typically formed by means of a buckle or clip that interconnects the ends of the strap. Such devices have been used for a variety of purposes including water rescue, helicopter extractions, ski lift evacuations and in other emergency situations. Typical of the prior art devices are those offered for sale by J. E. Weinel, Inc. as Model Nos. RS-1 and RS- 2, the latter being a side opening rescue sling.

Other types of prior art rescue slings and restraint devices are disclosed in U.S. Pat. No. 1,409,702 issued to Gill, U.S. Pat. No. 1,490,066 issued to Carr and U.S. Pat. No. 4,991,689 issued to Cole.

A drawback found in many of the prior art rescue harnesses and slings is that during actual rescue operations, the loop portion of the sling tends to twist and close making it difficult for the struggling victim to slip into the harness loop. Further, in many cases, even if the victim succeeds in emplacing the loop portion about his body, he can easily slip from the harness during the lifting operation. For example, when the loop portion is positioned under the victim's arms and about the chest or back, should the victim lose consciousness or become excessively fatigued during the lifting operation, the arms will extend upwardly causing the victim to slip downwardly through the harness loop.

The aforementioned drawbacks of the prior art rescue harnesses are uniquely overcome by the device of the present invention which is specially designed to remain open to receive the victim's head and arms after which it automatically cinches down about the victim's back or chest in a manner to positively secure the victim within the harness loop.

SUMMARY OF THE INVENTION

It is an object of the present invention to provide a rescue harness having an upper-body, encircling loop portion which is normally maintained in an open position but cinches down about the victim upon a force being exerted on a safety line attached to the harness.

It is another object of the invention to provide a rescue harness of the aforementioned character in which the upper-body, encircling loop in its normal open position can conveniently be entered by a victim from either side of the loop by inserting the arms and shoulders through the loop so that the loop will pass beneath the arm pits and about the chest or back.

Another object of the invention is to provide a rescue harness of the type described in the preceding paragraph in which the body-encircling loop in its normal open configuration will accept a very large person but will automatically cinch down to a small enough loop to safely secure even a small child within the device.

Another object of the invention is to provide a rescue harness as described in which the body-encircling loop will remain open until a force of predetermined magnitude is exerted on the safety line which is connected to the harness at which time the loop will cinch down about the victim.

Still another object of the invention is to provide a safety harness in which the body-encircling portion is formed from a strong fabric webbing surrounded by a flotation padding which maintains the body-encircling loop in an open configuration.

Another object of the invention is to provide a safety harness of the class described which is compact, light weight and easy to use with a minimum of instruction.

DESCRIPTION OF THE INVENTION

Figure 1:
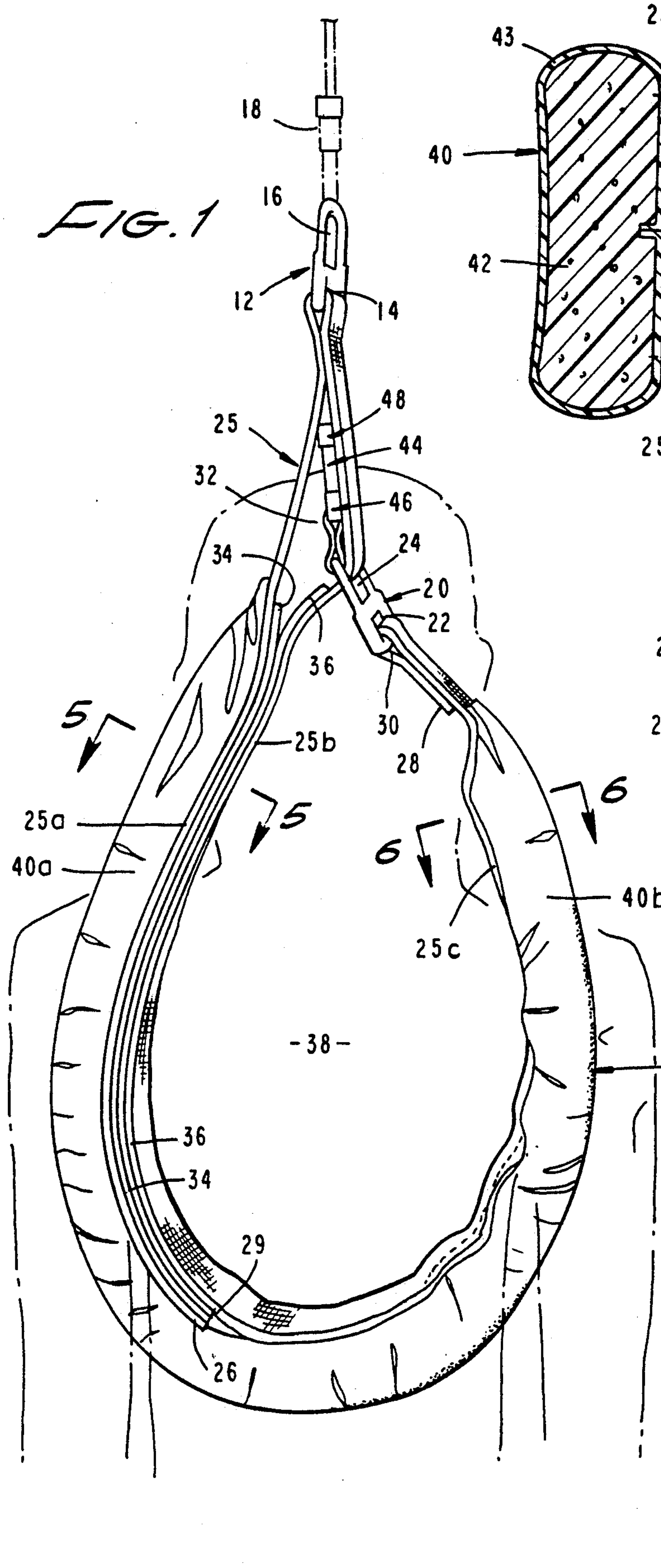
FIG. 1 is a generally perspective view of one form of the apparatus of the present invention shown in position about the upper body of a victim depicted in FIG. 1 by the dotted line.

Referring to the drawings and particularly to FIGS. 1, 2, 5 and 6, the rescue harness of the form of the invention there illustrated comprises a first generally D-shaped, buckle-like metal member 12 having a strap receiving opening 14 and a ring portion 16 for interconnecting the safety line 18 to first member 12. The apparatus further comprises a second generally D-shaped metal member 20 having a strap receiving opening 22 and a ring portion 24. Interconnecting members 12 and 20 is an elongated strap 25 having a first end 26 and a second end 28.

As best seen in FIG. 1, in assembling the harness first end 26 is first passed through ring portion 24 of member 20 then upwardly and through strap receiving opening 14 of member 12 and thence downwardly for secure interconnection with strap 25 as by sewing at an intermediate point 29. The second end 28 of strap 25 passes through strap receiving opening 22 of second metal member 20, is looped back and then interconnected to itself in the manner indicated in FIG. 1. With this arrangement, the strap is connected with metal member 20 in a manner such that member 20 can pivot within the opening 30 formed proximate end 28 of strap 25. In the form of the invention shown in the drawings, the first portion of strap 25*a* is located between first end 26 and member 12.

Figure 2:
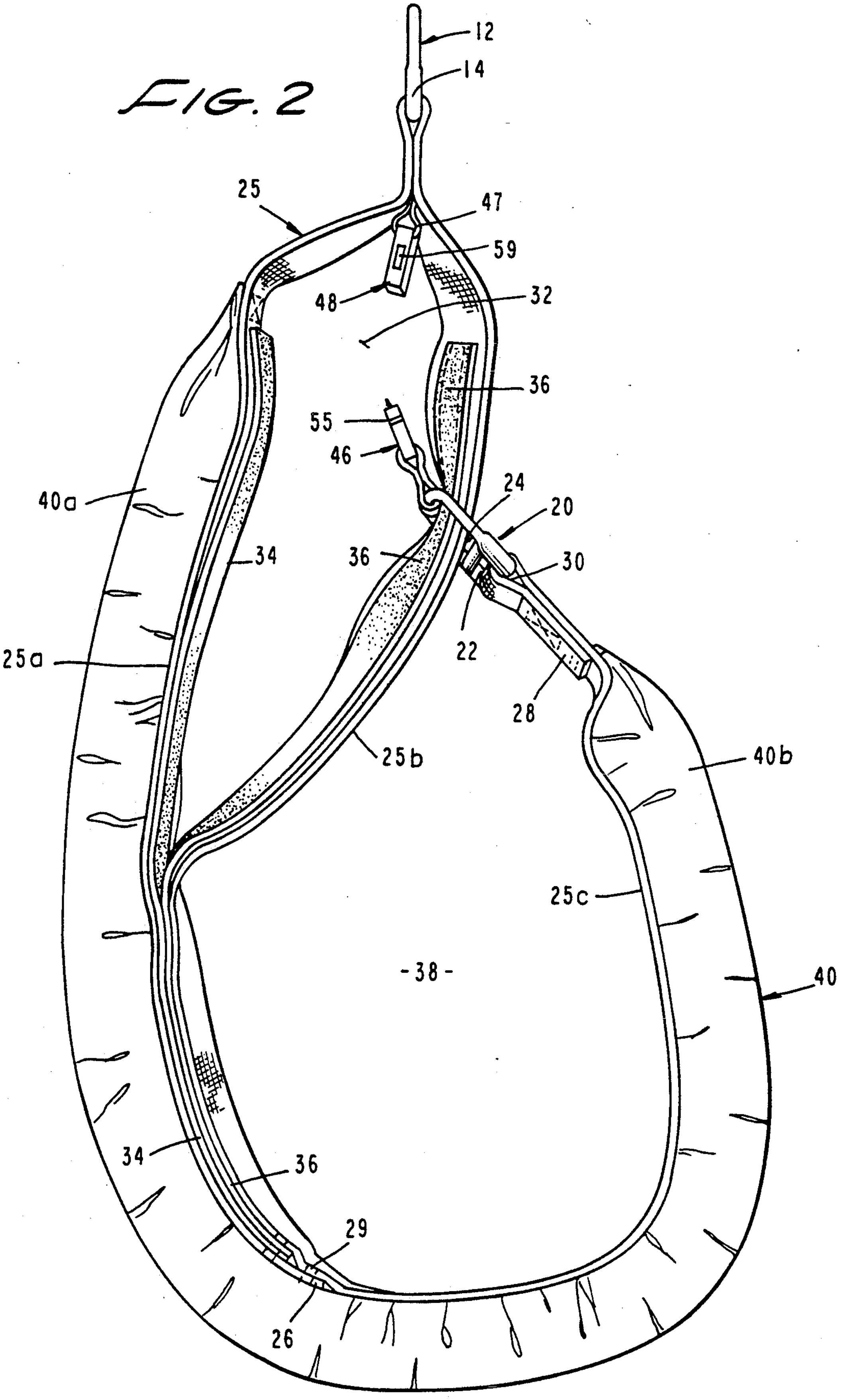
FIG. 2 is an enlarged perspective view similar to FIG. 1 but illustrating the separation of the connector means which functions to maintain the victim-receiving loop in an open configuration.
Figure 4:
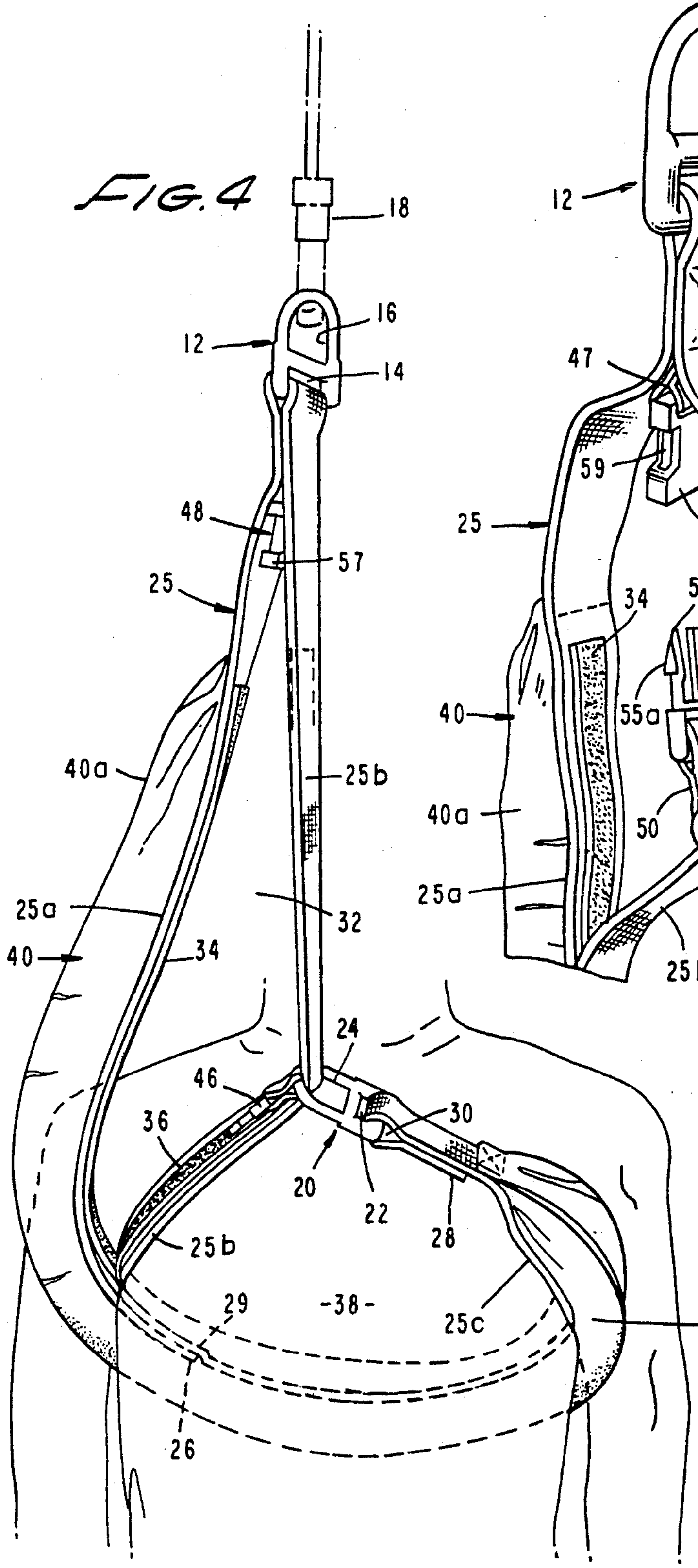
FIG. 4 is a generally perspective view similar to FIG. 3 but showing the rescue harness in a further cinched down position as might occur if the harness were used with a small adult or a child.

Referring also to FIG. 2, it is to be observed that upon passage of first end 26 of the strap through ring portion 24 of second member 20 then through strap-receiving opening 14 in first member 12 and thence downwardly for interconnection with the strap proximate intermediate point 29, there is formed a closed loop or ring slide opening generally designated in FIG. 2 by the numeral 32. In the manner presently to be described, ring portion 24 of second ring 20 is free to slide along a second portion 25*b* of the strap which is located opposite the first portion and is disposed between member 12 and intermediate point 29. Ring portion 24 is free to slide along portion 25*b* from a first harness open position shown in FIG. 1 to a fully cinched down harness position shown in FIG. 4.

Securement means are provided for normally maintaining the ring slide loop in the closed configuration as shown in FIG. 1. In the present form of the invention, this securement means comprises a first strip of material 34 which is affixed to the first portion 25*a* of strap 25. A second strip of material 36 is affixed to second portion 25*b* of strap 25 at a location between first member 12 and intermediate point 29 of strap 25. First strip of material 34 is provided with a multiplicity of hooks, while second strip of material 36 is provided with a multiplicity of loops adapted to be removably interconnected with the multiplicity of hooks formed on strip of material 34. Material having the desired hook and loop construction is commercially available and sold under the name and style VELCRO.

Figure 5:
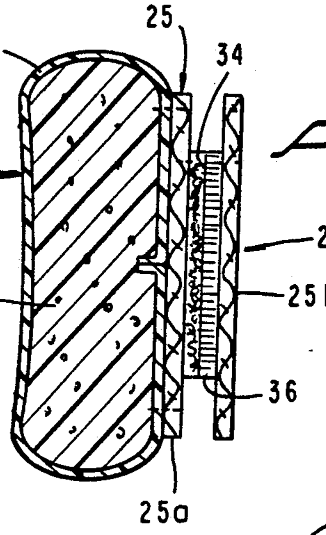
FIG. 5 is a cross-sectional view taken along lines 5—5 of FIG. 1
Figure 6:
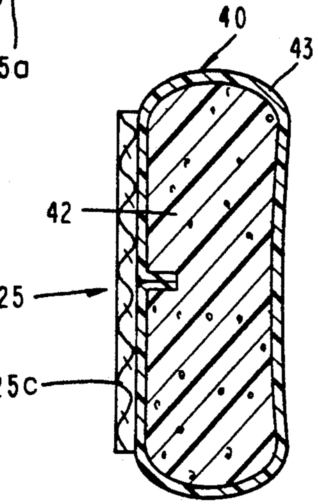
FIG. 6 is a cross-sectional view taken along lines 6—6 of FIG. 1.

To maintain the victim or person receiving loop, generally identified in FIG. 1 by the numeral 38, in an open configuration, there is provided means shown here as an elongated, generally tubular-shaped, pad-like flotation member 40. As best seen by referring to FIGS. 5 and 6, member 40 includes a pliable, foam-like flotation core material 42 which is encapsulated within a flexible, water resistant cover material 43. The first portion of the pad designated in FIG. 1 by the numeral 40*a* is securely interconnected with strap 25 in the manner shown in FIG. 5. The second portion of the pad generally designated in FIG. 1 by the numeral 40*b* is similarly connected with a third portion 25*c* of strap 25 in the manner illustrated in FIG. 6. As indicated in FIG. 5, first strip of material 34 is connected to the first portion of the strap designated in FIG. 5 by the numeral 25*a* by any suitable means such as sewing or adhesive bonding, while second strip of material 36 is affixed to the second strap portion 25*b* by any suitable means such as sewing or adhesive bonding. With this construction, when the strap portions 25*a* and 25*b* are brought into close proximity in the manner shown in FIG. 1, strips of material 34 and 36 will releasably interconnect so as to initially close ring slide loop 32 and assist in maintaining the victim receiving loop 38 in its open configuration shown in FIG. 1.

Figure 7:
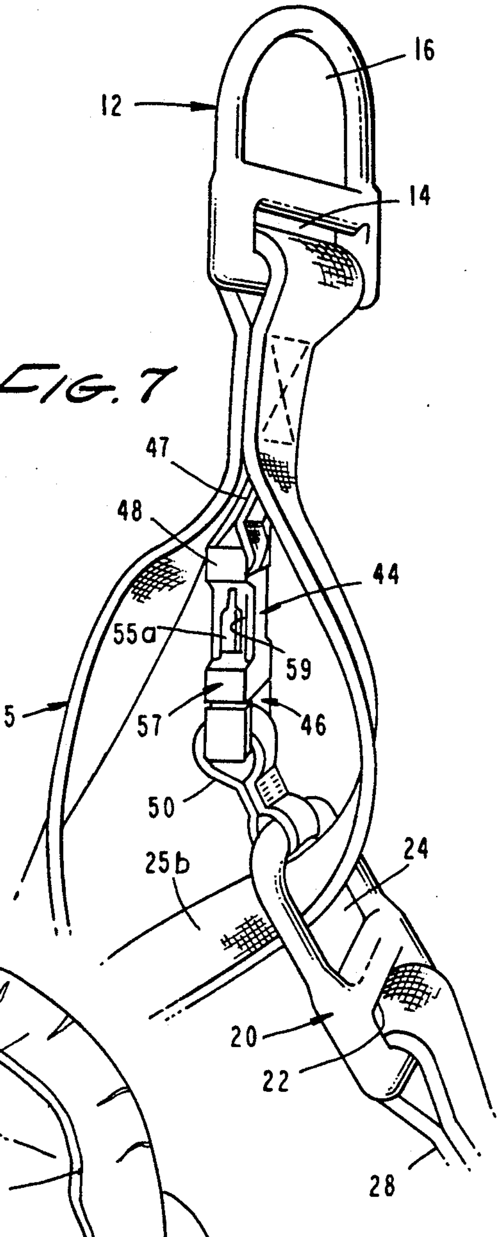
FIG. 7 is an enlarged, generally perspective, fragmentary view showing the connector means or spring-loaded slip of the apparatus in the closed position.
Figure 8:
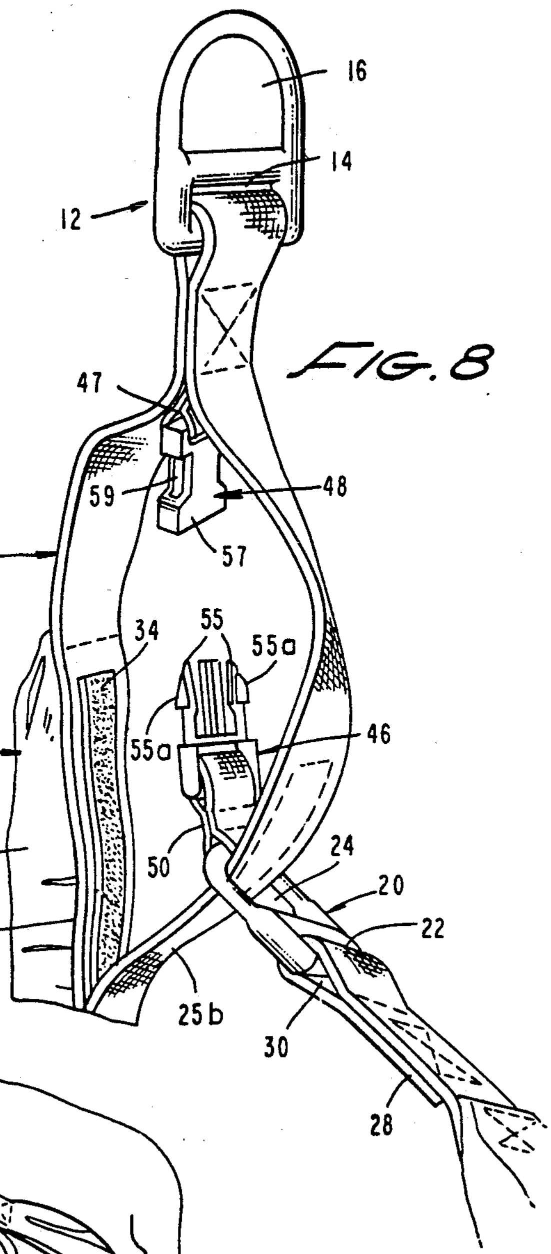
FIG. 8 is a generally perspective, fragmentary view similar to FIG. 7 but showing the connector means or spring clip in an open position.

Also functioning to maintain the person-receiving loop in its open configuration, is a connector means here shown as a clip assembly 44. Connector assembly 44 includes a first male portion 46 and a second female portion 48. Male portion 46 includes a biased prong means adapted to releasably interconnect portions 46 and 48. Female portion 48 is connected to strap 25 by means of a short length of strap 47 which is disposed proximate first buckle member 12. First portion 46 is interconnected to second member 20 by a short length of connector strap 50 which is disposed proximate second buckle member 20 (FIGS. 7 and 8). As will presently be described in greater detail, the prong means of male portion 46 will remain located within female portion 48 until a force is exerted on buckle members 12 and 20 which is sufficient to overcome the biasing forces tending to separate the prongs and to pull the prong means free from a pair of locking apertures formed in female portion 48.

When the clip assembly 44 is closed in the manner shown in FIGS. 1 and 7, member 20 is maintained in its uppermost position and ring slide loop 32 is held closed by hook and loop strips 34 and 36. This along with the semirigid character of pad 40 functions to normally maintain the victim receiving loop 38 in the open configuration illustrated in FIG. 1.

Upon exertion of a force on safety line 18 of a magnitude of about 10 to 20 pounds, clip assembly 44 will automatically release in the manner shown in FIG. 8. More particularly, upon the exertion of such a force, the spaced-apart, normally transversely, outwardly-biased fingers or prongs 55 of portion 46 will deform inwardly and will slip free of the female housing 57 of portion 48 causing portion 46 to separate from portion 48. As indicated in FIG. 8, until such a force is exerted, the cam surfaced protuberances 55*a* formed on each of the fingers 55 will remain locked in place within openings 59 formed in housing 57 thereby holding portions 46 and 48 together. Clip assembly 44 is of a character well known in the art and is readily commercially available.

Figure 3:
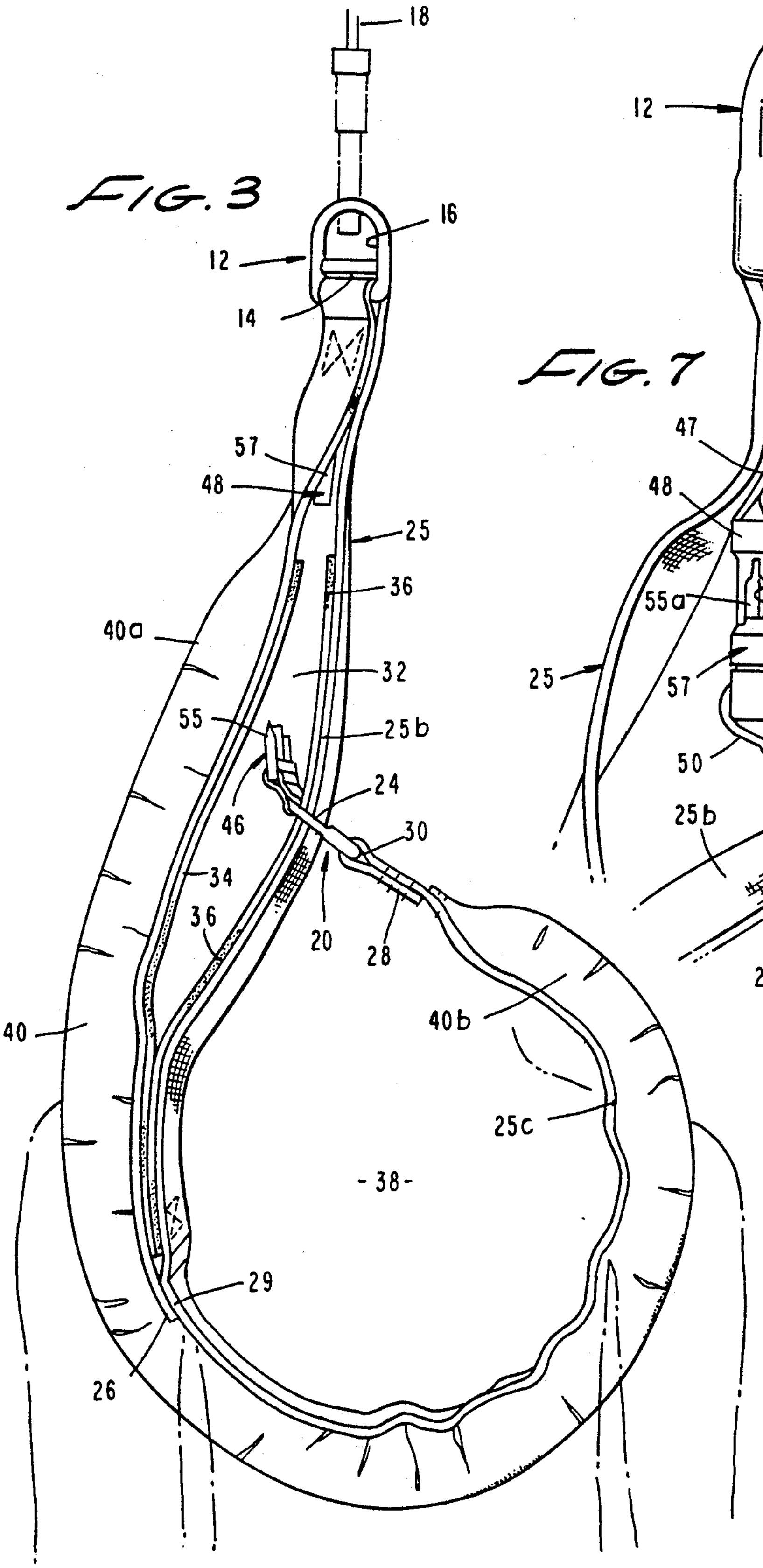
FIG. 3 is a generally perspective view similar to FIG. 2 but showing the cinching down of the rescue harness about the upper body portion of the victim.

Turning to FIG. 3, it can be seen that as soon as the clip assembly separates, ring opening 24 of member 20 will be free to slide along strap portion 25*b*. As it does so, hook and loop straps 34 and 36 will automatically peal apart allowing ring slide loop 32 to open. Continued sliding of member 20 along strap portion 25*b* will cause the person receiving loop 38 to continuously decrease in diameter so that it will securely cinch down about the victim in a manner shown in FIGS. 3 and 4. As previously mentioned, the unique design of the ring slide loop will permit the harness to securely cinch down about either a small adult or a child and positively prevent the person from slipping downwardly out of the cinch loop even if the victim loses consciousness.

To place the device in condition for reuse, ring 24 of member 20 is slipped upwardly along strap portion 25*b*, portions 44 and 46 of clip assembly 50 are reconnected and hook and loop strips 34 and 36 are rejoined.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A rescue harness for attachment to a person comprising:

(a) a first member having a strap receiving opening and a ring portion;

(b) a second member having a ring portion;

(c) an elongated strap having a first end, a second end and an intermediate point, said first end passing through said ring portion of said second member, through said strap receiving portion of said first member and being connected to said elongated strap proximate said intermediate point to form a ring slide loop, said second end of said elongated strap being connected to said second member forming a person-encircling loop;

(d) connector means connected to said second member and to said elongated strap and positioning said second member within said ring-side loop at a location proximate said first member, said connector means being releasable upon a predetermined amount of force being exerted on one of said first and second members tending to separate said members, whereby said ring portion of said second member is free to slide along said strap within said ring-slide loop; and (e) means for maintaining said person-encircling loop in a fully open configuration.

2. A rescue harness as defined in claim 1 in which said means for maintaining said person-encircling loop in a fully open configuration comprises an elongated pad connected to said elongated strap.

3. A rescue harness as defined in claim 1 in which said connector means comprises a clip assembly having:

(a) a first portion connected to said second ring-shaped member;

(b) a second portion connected to said elongated strap at a location proximate said first member; and (c) means releasably connecting said first and second portion.

4. A rescue harness as defined in claim 1 further including securement means for normally maintained said ring-slide loop in a closed configuration.

5. A rescue harness as defined in claim 4 in which said securement means comprises a first strip of material having a multiplicity of hooks affixed to said strap at a location between said first end thereof and said first member and a second strip of material having a multiplicity of loops affixed to said elongated strap at a location between said first member and said intermediate point, said hooks and loops being releasably interconnectable to maintain said ring-slide loop in said closed configuration.

6. A rescue harness for interconnecting of the upper body portions of a person with a safety line comprising:

(a) a first member having a strap receiving opening and a ring portion for interconnecting the safety line to said first member;

(b) a second member having a strap-receiving opining;

(c) an elongated strap having:

(i) a first end;

(ii) a second end connected to said second member;

(iii) an intermediate point;

(iv) a first portion located between said first end and said first member;

(v) a second portion located between said first member and said intermediate point, said first end of said strap passing through said ring portion of said second member and through said strap receiving opening of said first member and being interconnected with said elongated strap proximate said intermediate point forming a ring slide loop between said intermediate portion and said first member for sliding passage of said ring portion of said second member; and (d) connector means connected to said second member and to said elongated strap, said connector means being releasable upon the exertion of a predetermined force tending to separate said first and second members, whereby said ring portion of said second member can slide along said ring slide loop.

7. A rescue harness as defined in claim 6 in which said strap further comprises a third portion disposed between said second end thereof and said intermediate point and pad means for forming an open person-receiving loop between said pad means comprising a pad connected to said first and third portions of said strap.

8. A rescue harness as defined in claim 6 further comprising closure means for closing said ring slide loop.

9. A rescue harness as defined in claim 8 in which said closure means comprises a strip of material having a multiplicity of hooks affixed to one of said first and second strap portions and a strip of material having a multiplicity of loops affixed to the other of said first and second strap portions.

10. A first harness for interconnecting of the upper body portions of a person with a safety line comprising:

(a) a first member having a strap receiving opening and a ring portion for interconnecting the safety line to said first member;

(b) a second member having a strap-receiving opening;

(c) an elongated strap having:

(i) a first end;

(ii) a second end connected to said second member;

(iii) an intermediate point;

(iv) a first portion located between said first end and said first member;

(v) a second portion located between said first member and said intermediate point, said first end of said strap being passing through said ring portion of said second member and through said strap receiving opening of said first member and being interconnected with said elongated strap proximate said intermediate point forming a ring slide loop between said intermediate point and said first member for sliding passage of said ring portion of said second member;

(vi) a third portion disposed between said second end of said strap and said intermediate point; and (d) connector means connected to said second member at a location proximate said first member, said connector means being releasable upon the exertion of a predetermined force tending to separate said first and second members whereby said ring portion of said second member can slide along said ring slide loop;

(e) securement means normally maintaining said ring-slide loop in a closed configuration, said securement means comprising a first strip of material having a multiplicity of hooks affixed to one of said first and second portions of said elongated strap and a second strip of material having a multiplicity of loops affixed to the other of said first and second portions of said elongated strap, said hooks and loop being releasably interconnectable to maintain said ring-slide loop in said closed configuration; and (f) pad means connected to said elongated strap for forming an open, person-receiving loop, said person receiving loop being movable from a first open configuration to a cinched down configuration upon release of said connector means.

11. A rescue harness as defined in claim 10 in which said connector means comprises a clip assembly having:

(a) a first portion connected to said second member;

(b) a second portion connected to said elongated strap at a location proximate said first member; and (c) means releasably connecting said first and second portions.

12. A rescue harness as defined in claim 11 in which said means releasably connecting said first and second portion comprises a pair of outwardly biased fingers releasably received within said second portion of said clip assembly.

* * * * *